US012801455B2

(12) United States Patent
Hutcheson

(10) Patent No.: US 12,801,455 B2
(45) Date of Patent: Nov. 17, 2026

(54) DISTRIBUTED DEPLOYMENT OF SERVERLESS SYSTEMS MANAGEMENT INFRASTRUCTURE

(71) Applicant: Dell Products L.P., Round Rock, TX (US)

(72) Inventor: Jacob R. Hutcheson, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 749 days.

(21) Appl. No.: 18/163,895

(22) Filed: Feb. 3, 2023

(65) Prior Publication Data

US 2024/0264878 A1 Aug. 8, 2024

(51) Int. Cl.

*G06F 9/46* (2006.01)
*G06F 9/50* (2006.01)
*G06F 9/54* (2006.01)

(52) U.S. Cl.

CPC .......... *G06F 9/5077* (2013.01); *G06F 9/5072* (2013.01); *G06F 9/541* (2013.01)

(58) Field of Classification Search

CPC ...... G06F 9/5077; G06F 9/5072; G06F 9/541; G06F 9/45558; G06F 9/4401; G06F 2009/45562; G06F 2009/4557; G06F 2009/45575

See application file for complete search history.

(56) References Cited

U.S. PATENT DOCUMENTS

| | | | | |
|---|---|---|---|---|
| 10,860,380 | B1 * | 12/2020 | Kowalski | G06F 13/10 |
| 11,314,601 | B1 * | 4/2022 | Natanzon | G06F 11/1464 |
| 11,797,352 | B2 * | 10/2023 | Moyer | H04L 67/02 |
| 12,190,144 | B1 * | 1/2025 | Featonby | G06F 9/45558 |
| 2002/0069367 | A1 * | 6/2002 | Tindal | H04L 41/0869 726/5 |
| 2017/0177877 | A1 * | 6/2017 | Suarez | G06F 21/6218 |
| 2017/0180346 | A1 * | 6/2017 | Suarez | G06F 9/45558 |
| 2018/0048716 | A1 * | 2/2018 | Madhayyan | G06F 9/45558 |
| 2019/0347121 | A1 * | 11/2019 | Luo | G06F 9/542 |
| 2020/0320189 | A1 * | 10/2020 | Zhang | G06F 21/54 |
| 2021/0232439 | A1 * | 7/2021 | Fong | G06F 9/5083 |

(Continued)

*Primary Examiner* — April Y Blair
*Assistant Examiner* — Zhi Chen
(74) *Attorney, Agent, or Firm* — Jackson Walker L.L.P.

(57) ABSTRACT

A FaaS-based systems management method for implementing an onboarded management platform retrieves a manifest from a new or updated target device. The manifest indicates supported management operations and mapping coordinates for container images for performing management operations on the targeted device. Any unrecognized mappings in the manifest are added to a local FaaS mapping store and the target device is requested to push its container images to a local container registry. Communications with the target device may comply with an onboarding API that supports calls for retrieving the manifest and requesting the target device to push its container images to the local registry. An access credential token provided to the target device and included with the container images pushed to the local registry may enable the local registry to authenticate the container images. Verification that the local registry includes a container image for each mapping in the manifest may occur.

18 Claims, 4 Drawing Sheets

(56) References Cited

U.S. PATENT DOCUMENTS

| | | | | |
|---|---|---|---|---|
| 2021/0271489 | A1* | 9/2021 | Singhal ............... | G06F 9/45533 |
| 2023/0418595 | A1* | 12/2023 | BenHanokh .............. | G06F 8/71 |
| 2024/0086269 | A1* | 3/2024 | Sun ..................... | G06F 11/1441 |
| 2024/0281260 | A1* | 8/2024 | Godowski ............. | G06F 16/908 |
| 2024/0289662 | A1* | 8/2024 | Griffin ................... | G06N 10/20 |

* cited by examiner

110

| Model | FW/BMC Version | Operation | Faas Container Coords | |
|---|---|---|---|---|
| R640 | 3.20.20 | Inventory | dell/faas-inventory-idrac:25 | 310-1 |
| R640 | 4.10.10 | Inventory | dell/faas-inventory-idrac:36 | 310-2 |
| T640 | 4.10.10 | Inventory | dell/faas-inventory-idrac:36 | 310-3 |
| MX9116N | 10.5.4.1 | Inventory | dell/faas-inventory-os10:8 | ⋮ |
| Some3rdPartyModel | 0.0.1 | Inventory | 3rdparty/faas-inventory-xyx:1 | |
| R640 | 4.10.10 | FWUpdate | dell/faas-fwupdate-idrac:10 | 310-n |
| 301 | 302 | 302 | 304 | |

DISTRIBUTED DEPLOYMENT OF SERVERLESS SYSTEMS MANAGEMENT INFRASTRUCTURE

TECHNICAL FIELD

The present disclosure pertains to information handling systems and, more specifically, management of information handling system infrastructure.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When developing a system management software platform, much depends on the software's ability to understand the APIs and data model of the target device (s). Generally, standardized protocols evolve over time to define consistent API surfaces and payloads for managing infrastructure. As technology trends change, new standards arise to reflect the changes. Additionally, infrastructure management is not a static feature set. As new concepts and features are implemented, system management protocols must adapt to provide appropriate management support.

The ability to support API standards that change over time is one challenging aspect of implementing a system management platform. Until fairly recently, many widely implemented management platforms complied with WS-Management (MS-Man), a Distributed Management Task Force (DMTF) open standard defining a Simple Object Access Protocol/Extensible Markup Language (SOAP/XML) based messaging protocol for managing servers and other devices, applications, and various Web services. More recently, the Redfish standard, which implements a representational state transfer (REST)-compliant or RESTful interface for managing servers, storage, networking and converged infrastructure, has emerged as the prevailing standard for system management platforms. In addition, older protocols, including Simple Network Management Protocol (SNMP) and Intelligent Platform Management Interface (IPMI)-over-LAN are still in use. System management is still further complicated because different generations of hardware/firmware may implement different API standards. Even within a specific API or Data Model, there can be implementation differences from one hardware/firmware release to the next.

The issues noted above have resulted in platform implementations restricting the list of supported devices to those that implement specific system management protocols or originate from certain vendors and/or absorb the complexity of recognized device-protocol-function permutations within application code. Still further complicating the platform management landscape, new system management protocols may be implemented alongside previous protocols and may not reach parity for multiple releases. This has led to a large amount of complexity when attempting to support many generations of hardware from multiple vendors.

SUMMARY

The challenges discussed above may be addressed by a serverless system management solution suitable for one or more generations of heterogeneous platform infrastructure encompassing a plurality of system management protocols and version-specific implementation details. A group of container images may be defined, each of which implements the specific exchanges required to accomplish a given management operation for one or more supported resources. Container images may be specific to specific combinations of device and firmware version and the protocols and messaging details embedded in each container are independent of one another. The correct container image to use to accomplish a given operation is determined by mapping attributes of a managed device to specific container image coordinates. These mappings may be maintained in a published function-as-a-service (FaaS) catalog, which may be external to the managed platform. Similarly, the container images may be maintained in a container registry that is external to the management platform. In at least some such embodiments, the FaaS catalog and the container registry may be consumed from time to time by the serverless management solution. Details of an exemplary solution and architecture are described below with respect to FIGS. 1-3.

The implementations illustrated in FIGS. 1-3 rely on storage resources that are external to the management plane and, accordingly, connectivity between the management plane and the external environment is needed. Generally, the presence of external connections to the management domain are undesirable and/or inappropriate. As examples, external connections may be problematic when a site is air gapped, prohibitively remote, or lacks bandwidth sufficient to repeatedly pull container images. Subject matter described below with respect to FIGS. 4-6 extend and adapt the serverless, FaaS-based systems management features of FIGS. 1-3 to an onboarded, FaaS-based systems management platform.

In one aspect, a disclosed serverless, FaaS-based systems management method for implementing an onboarded management platform responds to discovering a target device by retrieving a manifest from the target device. The manifest includes information indicating management operations supported by the device and mapping coordinates for locating container images indicative of systems management interactions for performing a management operation on the targeted device. If the manifest includes unrecognized mapping coordinates, the unrecognized mapping coordinates are added to a local FaaS mapping store and the target device is requested to push its container images to a local container registry. Communications with the target device may be in accordance with an onboarding API that supports a retrieve-manifest API call for retrieving the manifest and a push-containers API call to request the target device to push the container images to the local FaaS registry. Communications in accordance with the API may be secured and push-containers call may provide the target device with an access credential token and endpoint information for accessing the local container registry. The local container registry may validate the access credential token as well as any container image signatures before accepting the container images. A verification that the local container registry includes a container image for each mapping coordinate in the manifest may be performed to confirm the platform as being operable to manage the newly added or updated device.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
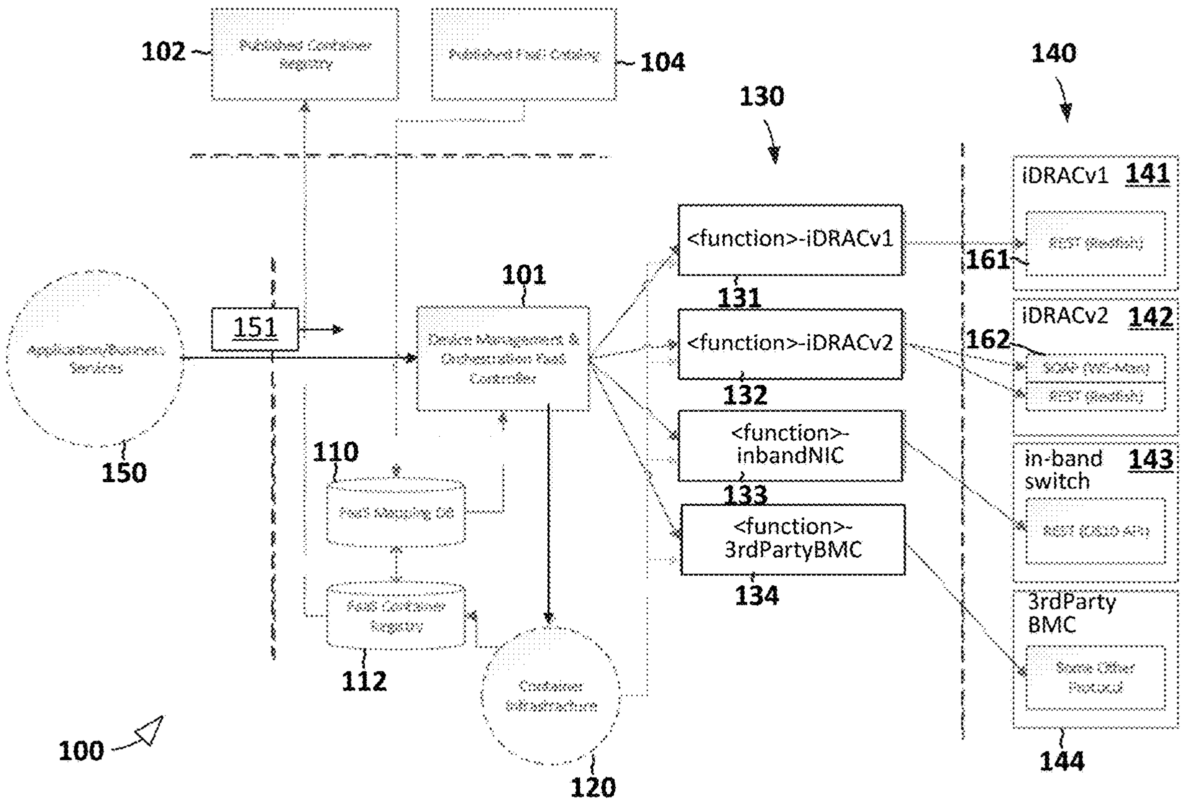
FIG. 1 illustrates an exemplary FaaS-based system management platform.

Exemplary embodiments and their advantages are best understood by reference to FIGS. 1-7, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic.

Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figures 2, 3:
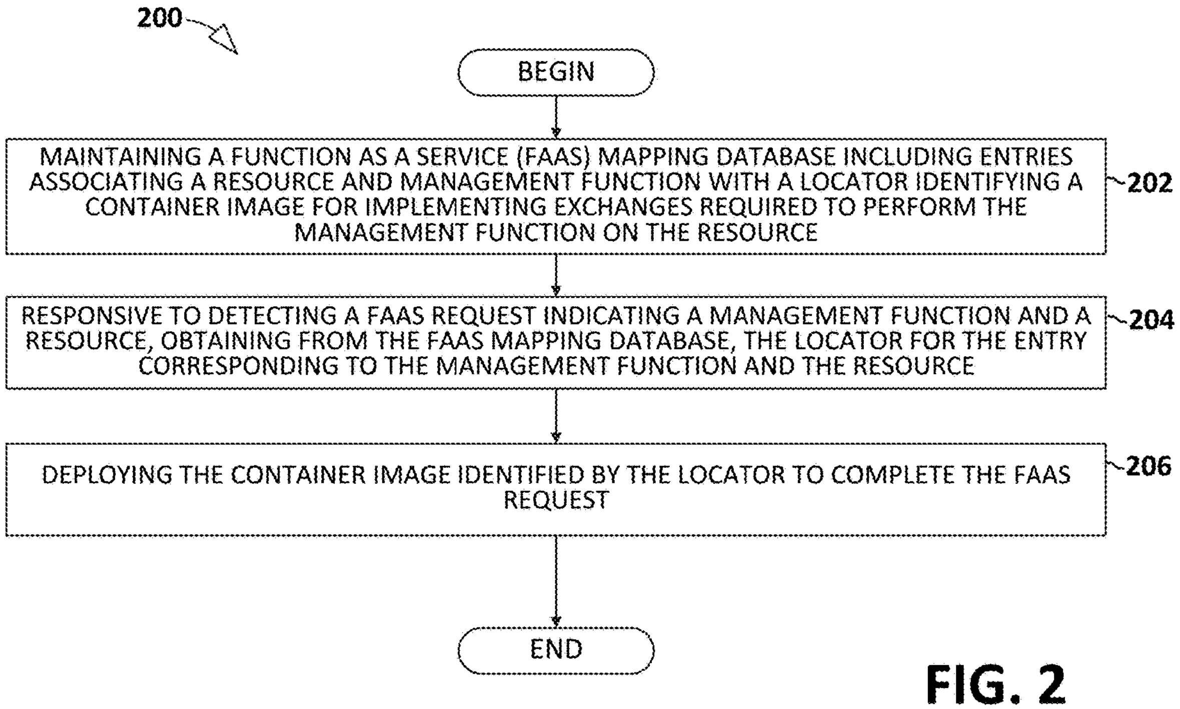
FIG. 2 illustrates a flow diagram for a system management method employing container images to implement management functions for managed resources.
FIG. 3 illustrates an exemplary data structure including mapping information associating container images for performing a given management operation on a specified infrastructure resource.
Figure 4:
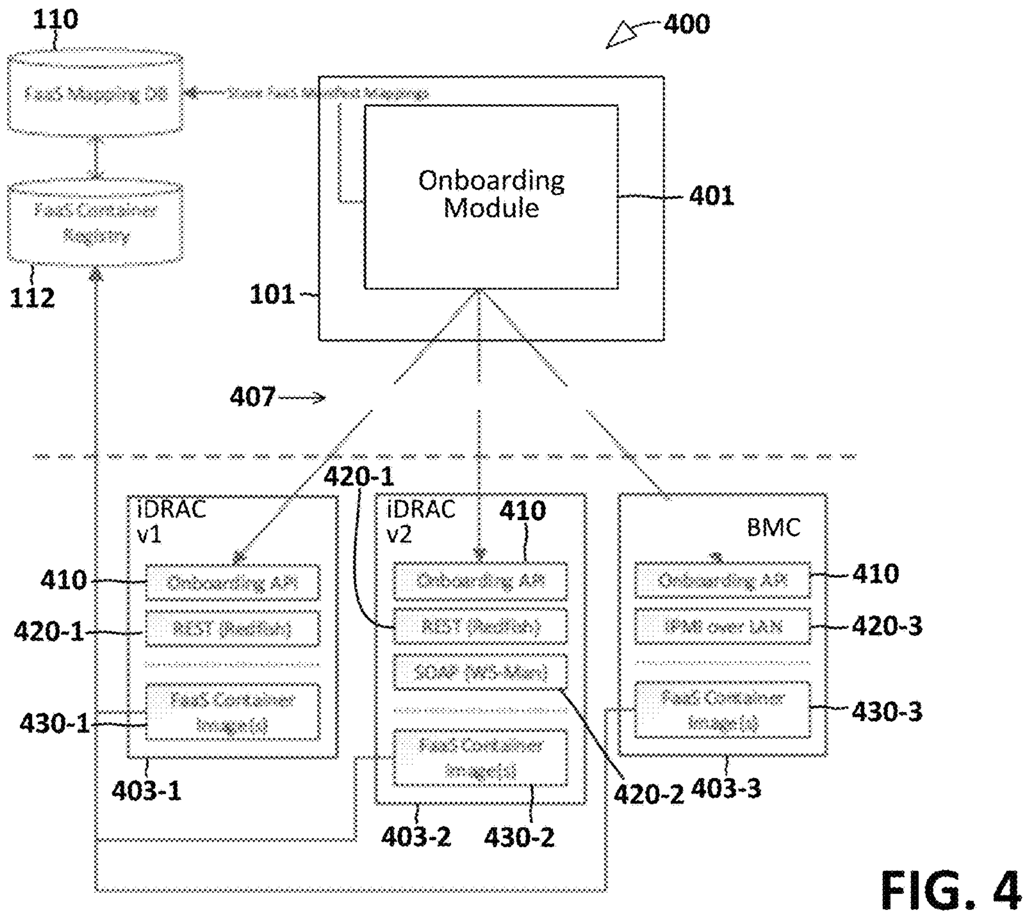
FIG. 4 illustrates an onboard FaaS-based systems management platform.
Figure 5:
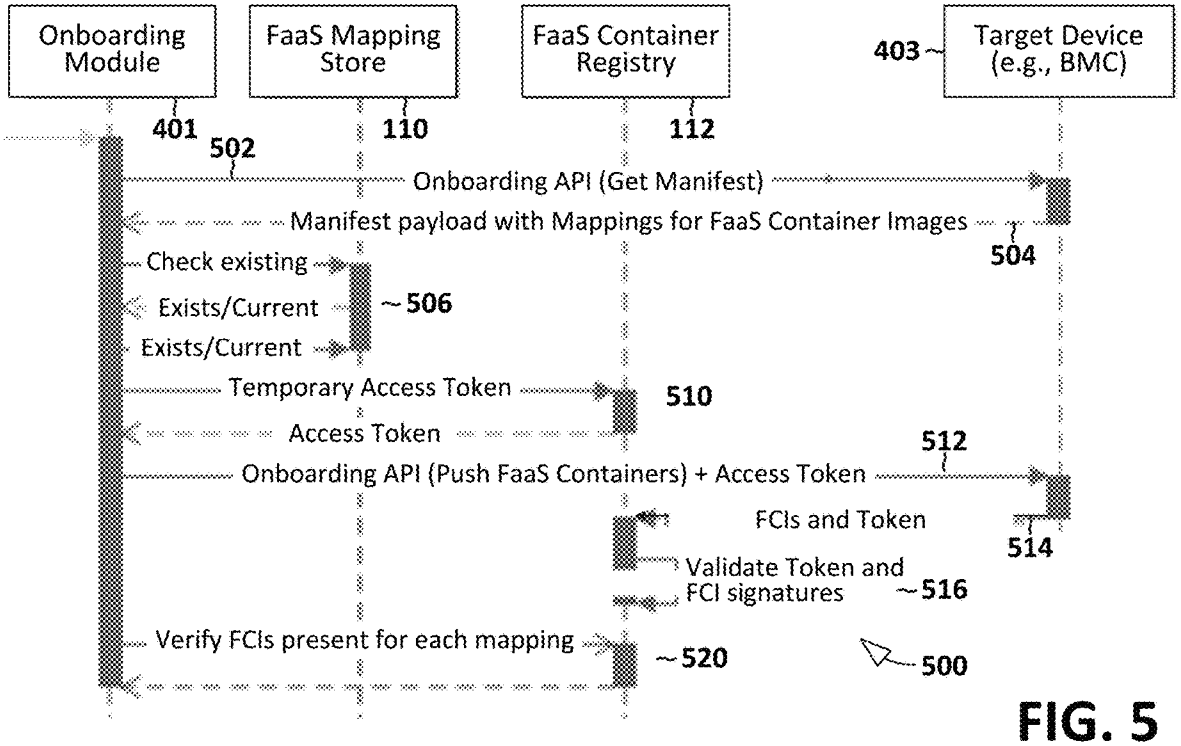
FIG. 5 illustrates an exemplary sequence diagram for implementing an onboard FaaS-based systems management platform.
Figure 6:
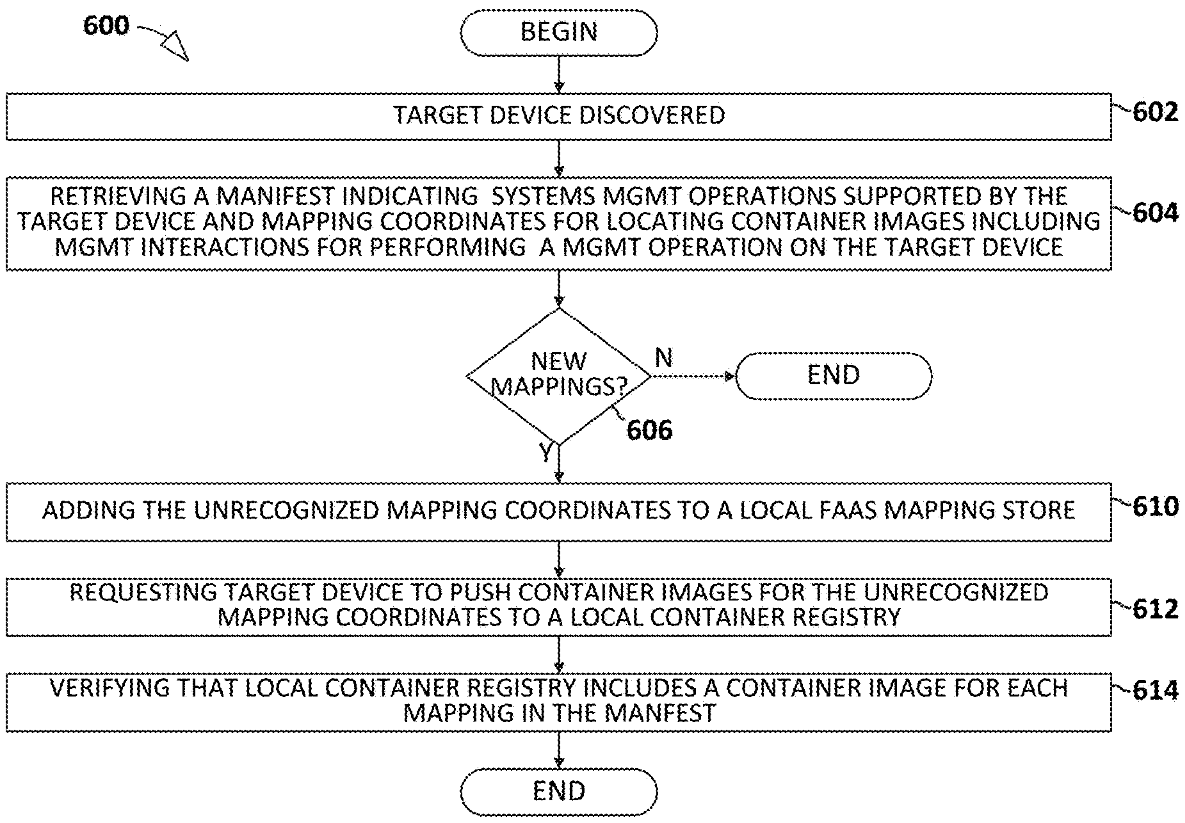
FIG. 6 illustrates a flow diagram of a systems management method suitable for implementing an onboard FaaS-based systems management platform.

Turning now to the drawings, FIGS. 1-3 are directed to a FaaS-based systems management platform that operates in conjunction with externally deployed data stores while FIGS. 4-6 describe a locally-contained systems management platform.

FIG. 1 illustrates an exemplary systems management platform 100 in accordance with disclosed subject matter for a container-based system management solution in which protocol, messaging, and other implementation details of management interactions for performing a given management operation on a specific version of a particular device are incorporated into a container image. Container images for supported combinations of management functions and platform resources may be maintained in a published container registry and may include a container image corresponding to each supported combination of management function and infrastructure resource. Resources may be defined in accordance with one or more characteristics or parameters of the resource. As an illustrative example, a first resource may correspond to a specific make and/or model of a server provisioned with a first version of system firmware while a second resource may correspond to the given make and/or model of the server provisioned with a second version of system firmware. In this example, the container registry may include two independent and distinct container images for performing a given management operation on the server model, with a first container image corresponding to instances of the server model provisioned with the first version of system firmware and a second container image corresponding to the instances of the server model provisioned with the second version of system firmware. The two containers may include or employ different API protocols, e.g., REST/JSON, SOAP/XML, etc., and/or different management interactions to perform the management operation and all protocol-specific and command-specific details are encapsulated in the applicable container image.

The platform 100 illustrated in FIG. 1 includes a FaaS-based system management controller (FSMC) 101 communicatively coupled to a FaaS mapping database 110, a FaaS container registry 112, and container infrastructure resources 120. In at least some embodiments, FSMC 101 monitors and processes system management requests 151 received from external applications/business services 150. A system management request 151 may indicate a system management operation to be performed on a specified resource or device. FSMC 101 may access FaaS mapping database 110 to retrieve a locator for a container image 130 corresponding to the management operation and infrastructure resource indicated in the request. FSMC 101 may forward the locator information for the appropriate container image to container infrastructure 120, which may then retrieve the container image from FaaS container registry 112 and deploy the retrieved container image 130 to the appropriate infrastructure resource 140 for execution. As depicted in FIG. 1, a published container registry 102 may be maintained, for example, on a Web portal that may be periodically consumed by platform 100. Likewise, platform 100 may have access to a published catalog 104 of FaaS locators and, in such embodiments, platform 100 may periodically synchronize FaaS mapping database 110 to reflect the locators included in the public catalog 104.

In at least one embodiment, infrastructure resources 140, including but not limited to servers and other hardware devices, may be specified by two or more parameters. As a non-limiting example, a server-type resource may be specified by a combination of a model identifier and a version identifier wherein the version identifier indicates a version of system firmware code provisioned on the applicable resource.

As depicted in FIG. 1, container images 130 include a first container image 131 for performing a particular function on an infrastructure resource identified as iDRACv1 141, wherein iDRAC refers to a baseboard management controller resource, illustrated in and described with reference to FIG. 4 below, from Dell Technologies. The container images 130 depicted in FIG. 1 further include a second container image 132 corresponding to the same management function as first container image 132, but configured for use in conjunction with an infrastructure resource identified as iDRACv2. In this example, iDRACv1 141 and iDRACv2 142 may refer to identical or similar iDRAC hardware resources configured with two different firmware versions. The illustrated container images 130 further include a container image 133 for performing the management function on an in-band network switch 143 and a container image 134 for performing the management function on a 3rd party BMC 144.

It should be noted that, although first firmware version 131 and second firmware version 132 are designed for the same management function and are executed on substantially similar or identical hardware, the two container images employ a different combination of management APIs. Specifically, whereas the first container image 131 uses a Redfish (RESTful) API 161, second container image 132 is based on multiple APIs including a WS-man (SOAP based) API 162. Thus, platform 100 does not impose hardware-based or function-based API constraints on the container images across different firmware versions.

For the sake of clarity and brevity, FIG. 1 illustrates container images for a single system management function, e.g., an inventory function, and a small number of infrastructure resources. It will be appreciated by those of ordinary skill, however, that other implementations may include substantially more resources and may support container images for more system management operations.

Referring now to FIG. 2, a flow diagram illustration of a container-based method 200 for implementing a serverless, system management platform for managing heterogeneous infrastructure is presented. In some embodiments, one or more of the operations illustrated in FIG. 2 may be performed by FSMC 101 of FIG. 1. The illustrated method 200 may, in at least some embodiments, include maintaining (operation 202) a FaaS mapping database including a plurality of entries. Each entry in the mapping database may associate a resource and a corresponding management function with a locator identifying a container image configured to implement management exchanges required to perform the management function on the resource. The method 200 illustrated in FIG. 2 further includes responding to detecting a FaaS request indicating a management function and a resource by obtaining (operation 204) from the FaaS mapping database, the locator for the entry associated with the indicated management function and the resource. The method 200 depicted in FIG. 2 further includes invoking the platform's container infrastructure to deploy (operation 206) the container image identified by the locator to the appropriate infrastructure resource and executed the request management function.

Referring now to FIG. 3, an exemplary FaaS mapping database 110 is depicted. The depicted mapping database includes multiple entries 310-1 through **310-*n* wherein each entry 310 includes a set of fields 301 through 304, each corresponding to a parameter, feature, or other characteristic of a supported infrastructure resource. The specific fields 301 through 304 illustrated in FIG. 3 are illustrative rather than limiting and other implementations may include more, fewer, and/or different fields. The FaaS mapping database 110 depicted in FIG. 3 includes a model identifier field 301, a BMC/firmware version field 302, a management operation field 303, and a locator field 304 including locator coordinates for retrieving the applicable container image from FaaS container registry 112. It should be noted that, as depicted in FIG. 3, two or more resources may refer to the same container image, where entry 310-2, corresponding to server model R640, and entry 310-3, corresponding to server model T640, both identify the same container image in field 304**.

Referring now to FIGS. 4-6, features of an onboard FaaS-based systems management platform, referred to herein simply as onboard platform 400, are illustrated. As suggested by its name, onboard platform 400, once suitably configured, is operable to perform FaaS-based systems management via elements that are entirely contained within the management platform domain.

Referring specifically to FIG. 4, the illustrated onboard platform 400 includes an onboarding module 401 communicatively coupled to FaaS mapping database 110 and FaaS container registry 112, both of which were illustrated in FIG. 1 and described in the accompanying text. Onboarding module 401, which is illustrated in FIG. 4 is a feature of FSMC 101 (FIG. 1), is further communicatively coupled to a group of managed devices identified in FIG. 4 as target devices 403. The illustrated target devices include a first iDRAC resource, identified as iDRACv1 403-1, a second iDRAC resource, identified as iDRACv2 403-2, and a generic, third-party BMC, identified simply as BMC 403-3, but it will be readily appreciated by those of ordinary skill in the art that the illustrated devices are illustrative rather than limiting and that other implementations may include more, fewer, and/or different target devices.

Each of the illustrated target devices 403 includes an interface, identified in FIG. 4 as onboarding API 410, enabling each target device 403 to communicate with onboarding module 401 in compliance with an API, referred to herein as the onboarding API. FIG. 4 illustrates onboarding communications 407, in accordance with the onboarding API, between onboarding module 401 and target devices 403 via their respective onboarding APIs 410. As described in more detail with respect to FIG. 5 and FIG. 6, onboarding communications 407 may include communications enabling onboarding module 401 to retrieve FaaS manifests from each target device 403 and provide access credential tokens to each target device 403. Each target device 403 depicted in FIG. 4 further includes one or more systems management API modules 420 and one or more FaaS container images 430. Consistent with subject matter illustrated in FIGS. 1-3 and described in the accompanying text, the systems management API modules 420 illustrated in FIG. 4 include a REST/Redfish module 420-1 included in first and second iDRACs 403-1 and 403-2, a SOAP/WS-MAN module 420-2 included in the second iDRAC 403-2, and an IPMI module 420-3. In at least some embodiments, iDRACv1 402-1 may represent an instance of iDRAC hardware provisioned with a first version of firmware while iDRACv2 may represent an instance of the same or substantially similar iDRAC hardware provisioned with a second version of firmware.

Referring now to FIG. 5, a sequence diagram illustrates exemplary communications 500 in accordance with the onboarding API to implement onboard platform 400. The illustrated communications may be triggered by the discovery 501 of a new or updated target device within the managed platform infrastructure. Such discovery may cause onboarding module 401 to issue an API call, identified in FIG. 5 as a get manifest request 502, for the newly added or updated target device 403. In response to receiving get manifest request 502, the applicable target device 403 returns (communication 504) a FaaS manifest payload including container image coordinates, i.e., mappings, for FaaS container images corresponding to the systems management functions supported by target device 403. Upon receiving the payload, onboarding module 401 may determine (506) whether the mappings in the manifest are already present and current within onboard platform 400.

If all the mappings in the FaaS manifest are already present and current, onboard platform 400 is operable to manage the newly added or updated device and onboarding sequence 500 may terminate. If one or more of the mappings in the FaaS manifest are either not present or not current, the applicable mapping information is added to the local store of FaaS mappings, i.e., FaaS mapping database 110, and onboarding sequence 500 continues.

In the illustrated onboarding sequence 500, onboarding module 401 prepares (510) an access token credential for its local container registry, i.e., FaaS container registry 112. Onboarding module 401 then provides the token and endpoint information for FaaS container registry 112 in a push-FaaS-containers API call (512) requesting target device 403 to push its container images to FaaS container registry 112. Target device 403 responds to the request by pushing (514) its container images and the access credential token to FaaS container registry 112. The FaaS container registry 112 validates (516) the token and signatures for the FaaS container images (FCIs). If the validation is successful, FaaS container registry 112 employs conventional layer caching to accept any container image that is not already present. Onboarding module 401 may then verify (520) that all container images referenced in the FaaS manifest provided by target device 403 are present within FaaS container registry 112. Upon a successful verification that all required container images are present, onboard platform 400 is operable to manage the newly added or updated target device while, beneficially, the management plane has not been required to establish communication with the externally-deployed container registry 102 or FaaS catalog 104.

Referring now to FIG. 6, a flow diagram of a method 600 suitable for implementing the onboard platform 400 of FIG. 4 is illustrated. In at least some embodiments, the illustrated method 600 may include operations performed by FSMC 101 of FIG. 4. The method 600 depicted in FIG. 6 is triggered by the discovery (602) of a new or updated target device, in response to which a FaaS manifest is retrieved (operation 604) from the discovered device. The FaaS manifest may include information indicative of management operations supported by the target device as well as mapping coordinates for locating one or more container images. Consistent with the subject matter presented in the preceding description of FIGS. 1-3, each container image may include or indicate systems management interactions suitable for performing a corresponding management operation with the targeted device.

Responsive to identifying (operation 606) one or more new or unrecognized mapping coordinates, the unrecognized mapping coordinates are added (operation 610) to a local FaaS mapping store and the target device is requested (operation 612) to push its container images to a local container registry. In at least some embodiments, operation 612 is implemented with an API call that includes a token containing access credentials for the local container registry. After the target device has responded to the request by pushing its Faas container images to the local container registry, along with any access credential token provided in the request, and the local FaaS registry has validated the token, if provided, and accepted any container not already present within the registry, the illustrated method 600 verifies (operation 614) that the local container registry includes a container image for each mapping in the manifest received from the target device. Upon a successful verification, the onboard platform is operable to manage the target device.

Figure 7:
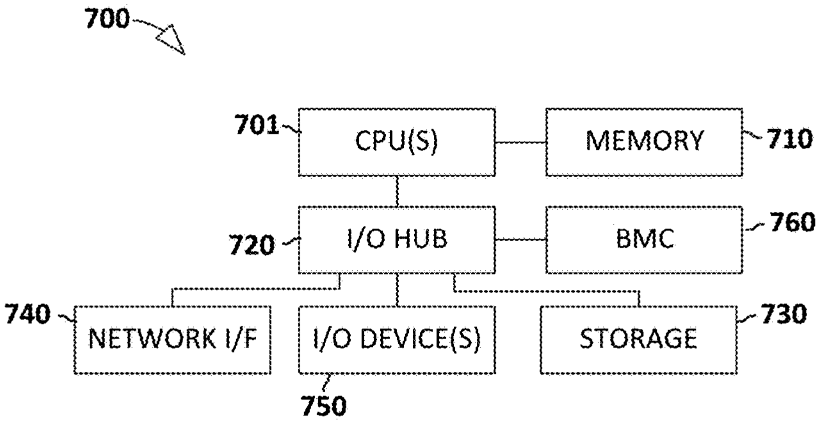
FIG. 7 illustrates an exemplary information handling system suitable for use in conjunction with features illustrated in FIGS. 1-6.

Referring now to FIG. 7, any one or more of the elements illustrated in FIG. 1 through FIG. 6 may be implemented as or within an information handling system exemplified by the information handling system 700 illustrated in FIG. 7. The illustrated information handling system includes one or more general purpose processors or central processing units (CPUs) 701 communicatively coupled to a memory resource 710 and to an input/output hub 720 to which various I/O resources and/or components are communicatively coupled. The I/O resources explicitly depicted in FIG. 7 include a network interface 740, commonly referred to as a NIC (network interface card), storage resources 730, and additional I/O devices, components, or resources 750 including as non-limiting examples, keyboards, mice, displays, printers, speakers, microphones, etc. The illustrated information handling system 700 includes a baseboard management controller (BMC) 760 providing, among other features and services, an out-of-band management resource which may be coupled to a management server (not depicted). In at least some embodiments, BMC 760 may manage information handling system 700 even when information handling system 700 is powered off or powered to a standby state. BMC 760 may include a processor, memory, an out-of-band network interface separate from and physically isolated from an in-band network interface of information handling system 700, and/or other embedded information handling resources. In certain embodiments, BMC 760 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:

responsive to discovering a target device, retrieving a manifest indicative of:

management operations supported by the target device; and mapping coordinates for locating one or more container images, wherein each container image is indicative of systems management interactions for performing a management operation with the targeted device; and responsive to identifying one or more unrecognized mapping coordinates:

adding the unrecognized mapping coordinates to a local FaaS mapping store;

requesting the target device to push container images for the unrecognized mapping coordinates to a local container registry; and verifying that the local container registry includes a container image for each mapping coordinate in the manifest.

2. The method of claim 1, wherein retrieving the manifest includes sending a retrieve-manifest API call in accordance with an onboarding API supported by the target device.

3. The method of claim 2, wherein requesting the target device to push the container images comprises sending a push-containers API call in accordance with the onboarding API.

4. The method of claim 3, wherein requesting the target device to push the container images comprises requesting the target device to push the container images securely.

5. The method of claim 4, further comprising, generating an access credential token for accessing the local container registry.

6. The method of claim 5, further comprising, including the access credential token and endpoint information, indicative of an endpoint for the local container, in the push-containers API call.

7. The method of claim 6, further comprising, validating the access credential token.

8. The method of claim 1, further comprising validating signatures of the container images.

9. The method of claim 1, wherein the target device comprises a baseboard management controller provisioned with a particular version of firmware.

10. An information handling system, comprising:

a central processing unit (CPU); and a computer readable memory including processor-executable instructions that, when executed by the CPU, cause the system to perform operations including:

responsive to discovering a target device, retrieving a manifest indicative of:

management operations supported by the target device; and mapping coordinates for locating one or more container images, wherein each container image is indicative of systems management interactions for performing a management operation with the targeted device; and responsive to identifying one or more unrecognized mapping coordinates:

adding the unrecognized mapping coordinates to a local FaaS mapping store;

requesting the target device to push container images for the unrecognized mapping coordinates to a local container registry; and verifying that the local container registry includes a container image for each mapping coordinate in the manifest . . .

11. The information handling system of claim 10, wherein retrieving the manifest includes sending a retrieve-manifest API call in accordance with an onboarding API supported by the target device.

12. The information handling system of claim 11, wherein requesting the target device to push the container images comprises sending a push-containers API call in accordance with the onboarding API.

13. The information handling system of claim 12, wherein requesting the target device to push the container images comprises requesting the target device to push the container images securely.

14. The information handling system of claim 13, further comprising, generating an access credential token for accessing the local container registry.

15. The information handling system of claim 14, further comprising, including the access credential token and end-point information, indicative of an endpoint for the local container, in the push-containers API call.

16. The information handling system of claim 15, further comprising, validating the access credential token.

17. The information handling system of claim 10, further comprising validating signatures of the container images.

18. The information handling system of claim 10, wherein the target device comprises a baseboard management controller provisioned with a particular version of firmware.

* * * * *